United States Patent
Westphal

(10) Patent No.: US 10,389,671 B2
(45) Date of Patent: Aug. 20, 2019

(54) SYSTEM AND METHOD FOR PROVIDING PERSONALIZED MESSAGING

(71) Applicant: W.W. Grainger, Inc., Lake Forest, IL (US)

(72) Inventor: Geoffry A. Westphal, Evanston, IL (US)

(73) Assignee: W.W. Frainger, Inc., Lake Forest, IL (US)

( * ) Notice: Subject to any disclaimer, the term of this patent is extended or adjusted under 35 U.S.C. 154(b) by 691 days.

(21) Appl. No.: 14/024,814

(22) Filed: Sep. 12, 2013

(65) Prior Publication Data

US 2015/0074205 A1    Mar. 12, 2015

(51) Int. Cl.
 *G06Q 30/06* (2012.01)
 *H04L 12/58* (2006.01)

(52) U.S. Cl.
 CPC ......... *H04L 51/24* (2013.01); *G06Q 30/0633* (2013.01); *H04L 51/14* (2013.01)

(58) Field of Classification Search
 CPC ......... H04L 51/04; H04L 51/10; H04L 51/14; H04L 51/32; H04L 51/38; H04L 51/066; H04L 67/306; H04L 12/5895; H04L 12/58; H04L 51/24; H04W 4/12; G06F 3/0482; G06F 17/30026; G06Q 10/00; G06Q 30/02; G06Q 30/0633; G06Q 30/24; G06Q 30/88; G06Q 30/0261; G06Q 30/241; H04M 1/72547
 USPC ..... 709/206, 204, 203, 231; 455/412.2, 466; 715/200, 232; 707/769; 340/539.13; 705/26.7, 30
 See application file for complete search history.

(56) References Cited

U.S. PATENT DOCUMENTS

| | | | | |
|---|---|---|---|---|
| 6,223,166 B1* | 4/2001 | Kay | ....................... | G06Q 10/02 380/51 |
| 6,748,421 B1* | 6/2004 | Ozkan | .................. | G06F 3/0481 348/E7.085 |
| 7,082,469 B2* | 7/2006 | Gold | ...................... | G06Q 30/02 709/231 |
| 7,212,829 B1* | 5/2007 | Lau | ........................ | G06Q 10/00 455/456.1 |
| 8,166,394 B1* | 4/2012 | Melnicki | ............... | G06F 3/0482 715/200 |
| 8,630,625 B2* | 1/2014 | Bi | ..................... | H04M 1/72547 370/312 |
| 8,668,146 B1* | 3/2014 | McGhie | ................. | G06Q 20/02 235/375 |
| 8,935,344 B2* | 1/2015 | Mayala | ................ | G06Q 10/107 709/206 |
| 8,984,070 B2* | 3/2015 | Batel | .................... | G06F 17/3089 455/466 |

(Continued)

OTHER PUBLICATIONS

Disney Post, Disney Magical Message at DisneyStore.com, Nov. 28, 2012, 4 pages, https://thewaltdisneycompany.com/blog/disney-store-disney-magical-me . . .

*Primary Examiner* — Ranodhi Serrao
*Assistant Examiner* — James N Fiorillo
(74) *Attorney, Agent, or Firm* — Greenberg Traurig, LLP

(57) ABSTRACT

A user associates a supply chain event with a personalized message. The system causes the personalized message (or a link thereto) to be sent to a recipient using a selected dissemination method when the supply chain event occurs.

9 Claims, 7 Drawing Sheets

(56) References Cited

U.S. PATENT DOCUMENTS

| | | | |
|---|---|---|---|
| 2002/0152267 A1* | 10/2002 | Lennon | G06F 16/40 709/203 |
| 2003/0158791 A1* | 8/2003 | Gilberto | G06Q 10/08 705/26.81 |
| 2004/0093281 A1* | 5/2004 | Silverstein | G06Q 20/04 705/26.8 |
| 2004/0107160 A1* | 6/2004 | Goclowski | G06Q 30/0601 705/37 |
| 2006/0293956 A1* | 12/2006 | Walker | G06Q 30/0212 705/14.14 |
| 2007/0130274 A1* | 6/2007 | Lee | H04W 4/12 709/206 |
| 2007/0177586 A1* | 8/2007 | Eyal | G06F 17/30029 370/352 |
| 2007/0208751 A1* | 9/2007 | Cowan | G06Q 30/02 |
| 2007/0226053 A1* | 9/2007 | Carl | G06Q 30/02 705/14.39 |
| 2008/0120129 A1* | 5/2008 | Seubert | G06Q 10/06 705/35 |
| 2008/0195424 A1* | 8/2008 | Pierce | G06Q 40/08 705/4 |
| 2008/0306877 A1* | 12/2008 | Mandeles | G06Q 20/3821 705/76 |
| 2009/0063295 A1* | 3/2009 | Smith | G06Q 30/02 705/26.2 |
| 2009/0077179 A1* | 3/2009 | Bi | H04M 1/72547 709/206 |
| 2009/0077460 A1* | 3/2009 | Li | G06F 17/30026 715/203 |
| 2009/0125425 A1* | 5/2009 | Kloostra | G06Q 10/0875 705/29 |
| 2009/0158136 A1* | 6/2009 | Rossano | H04L 51/38 715/232 |
| 2009/0209275 A1* | 8/2009 | Moraes | H04L 51/00 455/466 |
| 2010/0138298 A1* | 6/2010 | Fitzgerald | G06F 21/88 705/14.53 |
| 2010/0145737 A1* | 6/2010 | Joao | G06Q 20/10 705/4 |
| 2010/0274729 A1* | 10/2010 | Holm | G06Q 20/04 705/80 |
| 2011/0077999 A1* | 3/2011 | Becker | G06Q 10/10 705/7.35 |
| 2011/0202866 A1* | 8/2011 | Huang | G06F 3/0482 715/779 |
| 2011/0283172 A1* | 11/2011 | Berger | G06Q 10/10 715/202 |
| 2012/0136704 A1* | 5/2012 | Carlson | G06Q 30/02 705/14.17 |
| 2012/0173639 A1* | 7/2012 | Walsh | G06Q 30/02 709/206 |
| 2012/0190386 A1* | 7/2012 | Anderson | G01C 15/04 455/456.3 |
| 2013/0046781 A1* | 2/2013 | Frankel | G06Q 30/02 707/769 |
| 2013/0204723 A1* | 8/2013 | Roberts | G06Q 30/202 705/17 |
| 2013/0211970 A1* | 8/2013 | Glass | G06Q 30/0641 705/27.1 |
| 2013/0218766 A1* | 8/2013 | Mueller | G06Q 20/32 705/42 |
| 2013/0254293 A1* | 9/2013 | Reedy | H04L 67/02 709/204 |
| 2013/0317941 A1* | 11/2013 | Stoll | G06Q 30/0609 705/26.35 |
| 2013/0346337 A1* | 12/2013 | O'Donnell | G06Q 10/0833 705/333 |
| 2014/0164529 A1* | 6/2014 | Kleppmann | H04L 29/08072 709/206 |
| 2014/0207610 A1* | 7/2014 | Erez | G06Q 30/0633 705/26.7 |
| 2014/0207662 A1* | 7/2014 | Isaacson | G06Q 20/342 705/39 |
| 2014/0244488 A1* | 8/2014 | Kim | G06Q 20/02 705/39 |
| 2014/0258055 A1* | 9/2014 | Wolfe | G06Q 20/105 705/30 |
| 2014/0279205 A1* | 9/2014 | Ganesh | G06Q 50/01 705/26.7 |
| 2015/0067077 A1* | 3/2015 | DiSano | H04L 51/32 709/206 |
| 2015/0193061 A1* | 7/2015 | Stekkelpak | G06F 3/048 715/716 |
| 2015/0206225 A1* | 7/2015 | Stoll | G06Q 30/0631 705/26.7 |
| 2015/0341304 A1* | 11/2015 | Sherman | H04L 51/32 709/206 |
| 2018/0032997 A1* | 2/2018 | Gordon | G06Q 20/3224 |

* cited by examiner

SYSTEM AND METHOD FOR PROVIDING PERSONALIZED MESSAGING

BACKGROUND

Systems and methods for facilitating commerce via the Internet are well known. In such systems, after a consumer places a product purchase order with a vendor of product, the vendor of product and/or a third party that is also involved in the product order fulfillment process will often cause one or more notifications to be issued to the order placing consumer and/or an intended recipient of the ordered product. Such notifications are typically used to notify the order placing consumer and/or the intended recipient that the product purchase order has been received, that the product purchase order has been successfully processed, that the ordered product has been shipped, that the ordered product has been delivered, etc. Such notifications are also often used to notify the order placing consumer and/or the intended recipient when a problem occurs in the product order fulfillment process, for example when the ordered product is out of stock, when the ordered product cannot be delivered, etc. Such notifications are typically sent electronically, via email, text message, or the like, and, in some circumstances, one or more of the notifications, such as receipts, promotional materials, etc., are also or alternatively provided in physical form with the ordered product when it is shipped.

SUMMARY

The following describes a system and method for providing personalized messaging upon the occurrence of a supply chain event. To this end, the system provides a wizard that functions to assist a user in creating the personalized message and for establishing the conditions by which the personalized message is to be disseminated to an intended recipient. Using the information gathered by the wizard, the system causes the personalized message (or a link thereto) to be sent to the intended recipient using a selected dissemination method upon the occurrence of a selected supply chain event.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

With reference to the figures, the following describes a system and methods for allowing users to provide personalized messages to others. Generally, the personalized messages are associated with notifications that are caused to be issued during a product order fulfillment process. The personalized messages may include video messages and/or audio messages. The personalized messages may be directly disseminated to an intended recipient, for example by being included as an attachment to (or embedded in) an electronically transmitted notification, and/or may be indirectly disseminated to an intended recipient, for example by being made accessible via use of a link included as a part of an electronically or physically transmitted notification.

Figure 1:
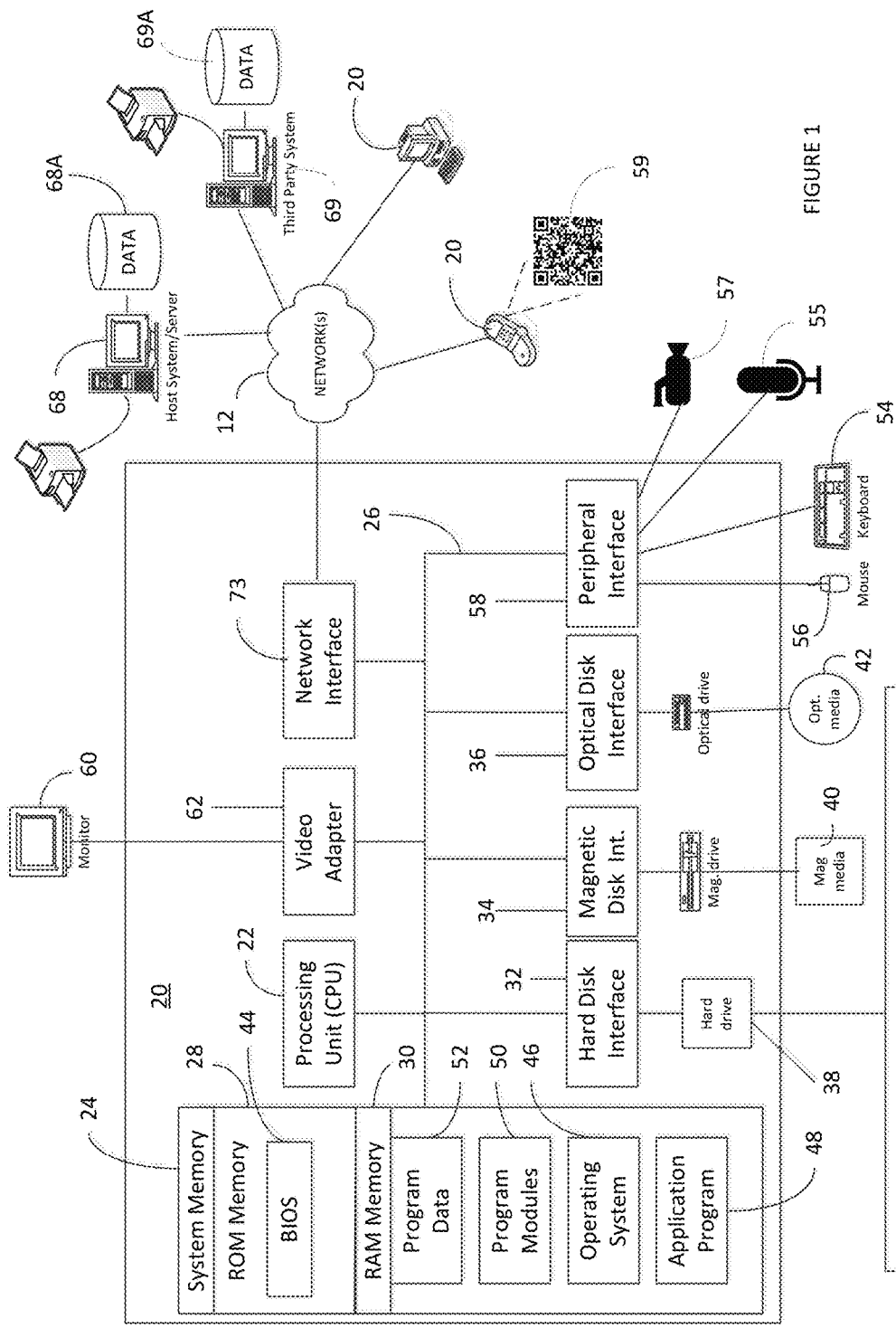
FIG. 1 is a block diagram illustrating components of an exemplary network system in which the methods described hereinafter may be employed.

Turning to FIG. 1, an exemplary computing system for use in creating and disseminating such personalized messages is illustrated by way of example only. In the exemplary computer system a plurality of processing devices 20/68 are linked via a network 12, such as a wide area network or the Internet. Processing devices 20, illustrated in the exemplary form of a device having conventional computer components, are provided with executable instructions to, for example, provide a means for a user to access a remote processing device, e.g., a host server system 68, via the network 12 to, among other things, perform a search for products and/or services (individually and collectively referred to hereinafter as "products"), place a product purchase order, receive and/or review electronic notifications that have been generated by the system, e.g., by the host server system 68 and/or third party server system 69, create personalized messages, and access personalized messages that have been created for the user as a recipient thereof. Generally, the computer executable instructions reside in program modules which may include routines, programs, objects, components, data structures, etc. that perform particular tasks or implement particular abstract data types. Accordingly, those skilled in the art will appreciate that a processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of discrete processing devices 20, those skilled in the art will also appreciate that the various tasks described hereinafter may be practiced in a distributed or cloud-like environment having multiple processing devices linked via a local or wide-area network whereby the executable instructions, required data, etc. may be associated with and/or executed by one or more of multiple processing devices.

For performing the various tasks in accordance with the executable instructions, a processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional, external memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital video-disks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, camera, picture editor, etc.), other program modules 50, and/or program data 52. Still further, computer-executable instructions may be downloaded to one or more of the computing devices as needed, for example, via a network connection.

A user may interact with the various application programs, etc. of a processing device 20, e.g., to enter commands and information into the processing device 20, through input devices such as a touch screen or keyboard 54, a pointing device 56, a microphone 55, and a camera 57, e.g., a video camera, stereoscopic camera, etc. As will be described in greater detail hereinafter, the camera 57 may be used to capture information for use in a personalized message that is being created for dissemination to another and/or to scan a barcode 59 having an embedded link to a message that has been created for a recipient thereof. While not illustrated, other input devices may include a joystick, a game pad, a scanner, a gesture recognizing device, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

A processing device 20 may also utilize logical connections to one or more remote processing devices, such as the vendor or host server system 68 having one or more associated data repositories 68A in which is stored, for example, product information, customer information, personalized message recipient information, and created personalized messages. In this regard, while the host server system 68 has been illustrated in the exemplary form of a computer, it will be appreciated that the host server system 68 may, like processing device 20, be any type of device having processing capabilities. Again, it will be appreciated that the host server system 68 need not be implemented as a single device but may be implemented in a manner such that the tasks performed by the host server system 68 and/or data needed for performance of such tasks are distributed to a plurality of processing devices linked through a communication network, e.g., implemented in the cloud. Additionally, the host server system 68 may have logical connections to other third party server systems 69 via the network 12 as needed and, via such connections, will be associated with data repositories 69A that are associated with such other third party server systems.

For performing tasks, the host server system 68 may include many or all of the elements described above relative to the processing device 20. By way of further example, the host server system 68 includes executable instructions stored on a non-transient memory device for, among other things, handling search requests, providing search results, providing instructions for use in creating personalized messages, handing orders for products/initiating product order fulfillment, causing personalized messages to be disseminated to intended recipients, storing personalized messages, handling requests to access stored personalized messages, generating physical notifications (e.g., via use of printers), etc. Communications between the processing device 20 and the host server system 68 may be exchanged via a further processing device, such as a network router, that is responsible for network routing. Communications with the network router may be performed via a network interface component 73. Thus, within such a networked environment, e.g., the Internet, World Wide Web, or other like type of wired or wireless network, it will be appreciated that program modules depicted relative to the processing device 20, or portions thereof, may be stored in the memory storage device(s) of the host server system 68.

Figure 2:
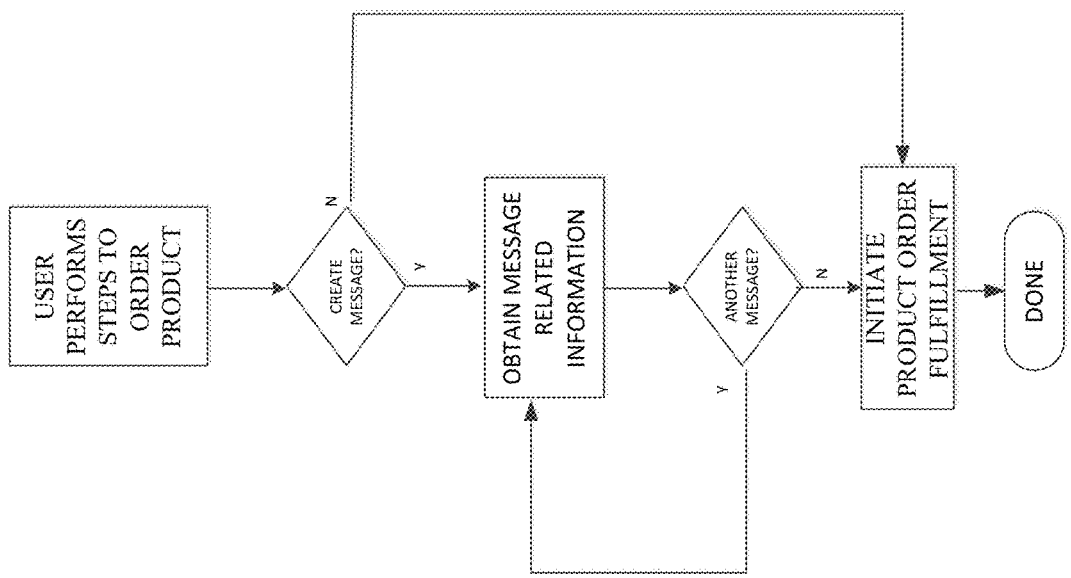
FIG. 2 illustrates an exemplary method used to obtain information related to a personalized message.

As noted above, the subject system and methods function to provide a user with the ability to create personalized messages for direct and/or indirect dissemination to one or more intended recipients. By way of non-limiting example, FIG. 2 illustrates a method by which the system facilitates the creation of a personalized message by a user for one or more intended recipients. Generally, the user will be provided with an opportunity to create a personalized message when one or more predetermined points are reached in the product ordering process. Because the steps associated with locating a product and for placing a product purchase order with a vendor are well known, for example being described in commonly assigned U.S. Pat. No. 8,429,018 which is incorporated herein by reference in its entirety, these steps need not be described herein for the sake of brevity.

Figure 3:
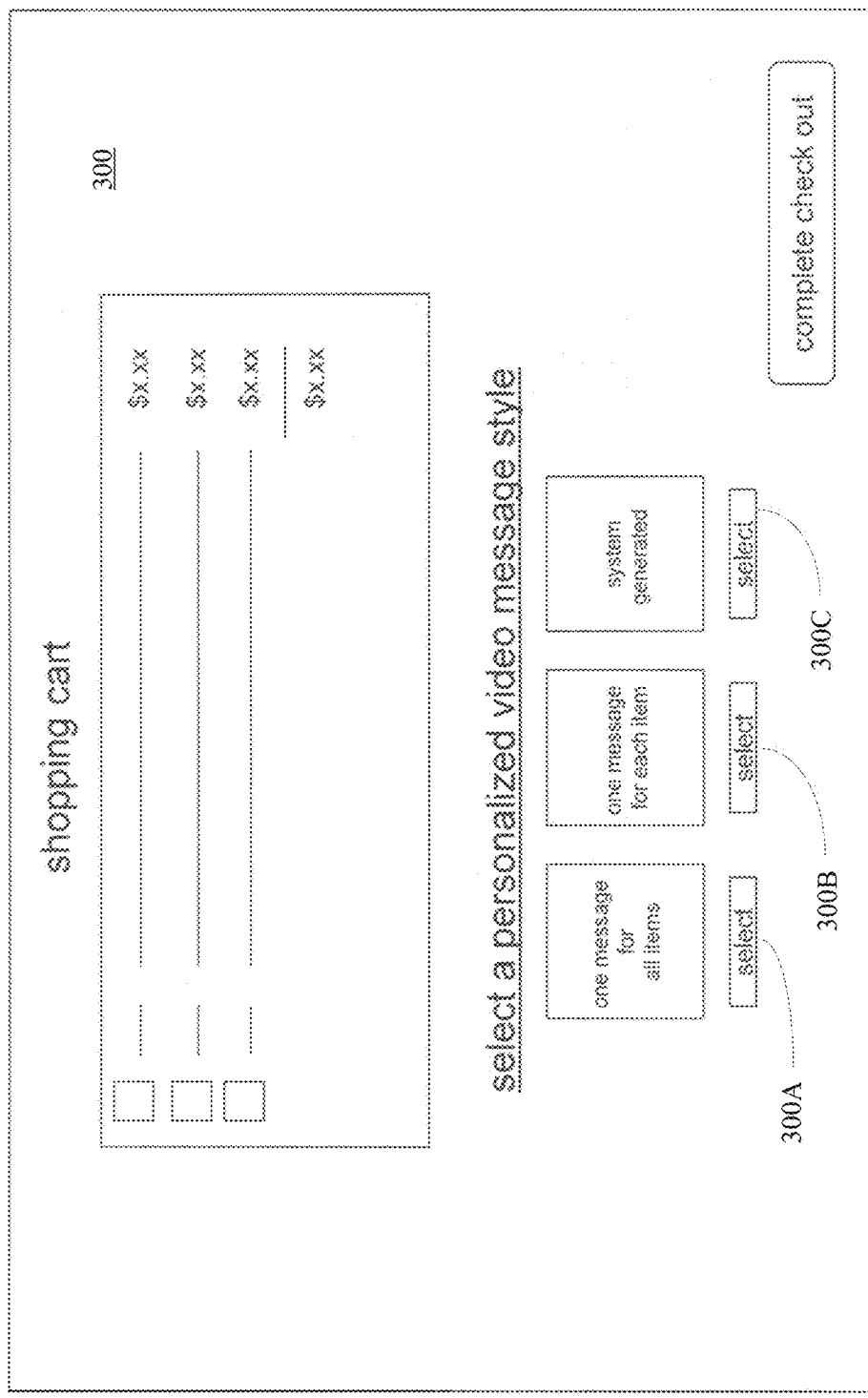
FIG. 3 illustrates an exemplary page having exemplary user interface elements for use in initiating the method illustrated in FIG. 2.

More particularly, when a predetermined point in the product ordering process is reached, for example, upon the user entering the product order check-out phase of the product ordering process as shown in FIG. 3, the system will cause a webpage 300 to be displayed to the user wherein the webpage 300 has user interface elements by which the user can indicate to the system that the user desires to create a personalized message for the product purchase order. In this regard, it is contemplated that the user can indicate a desire (via an interaction with user interface element 300A) to create one or more personalized messages for the product purchase order in its entirety, indicate a desire (via an interaction with user interface element 300B) to create one or more personalized messages for one or more individual products within the product purchase order, or indicate a desire (via an interaction with user interface element 300C) to use a system generated/pre-created message for the product purchase order, either for the product order in its entirety or for one or more individual products within the product order. It is additionally contemplated that the sending of any created personalized message(s) can be provided free of charge and/or be subject to a charge (preferably being charged to the person sending the message) and that the charge, if any, may change depending upon the size of and/or type of personalized message to be sent to an intended recipient of the personalized message (for example an audio message may be free while a video message may have a charge associated therewith, a simple video message may be free while a video message using a special background image may have a charge associated therewith, a video message having a given time length may be free while a video message having a time length exceeding the given time length may have a charge associated therewith, a video using background music or video clips from movies or television may have a charge associated therewith, a message using a celebrity voice or likeness may have a charge associated therewith, a message using a sports team logo may have a charge associated therewith, a message that uses content having a licensing fee, etc.).

Figure 4:
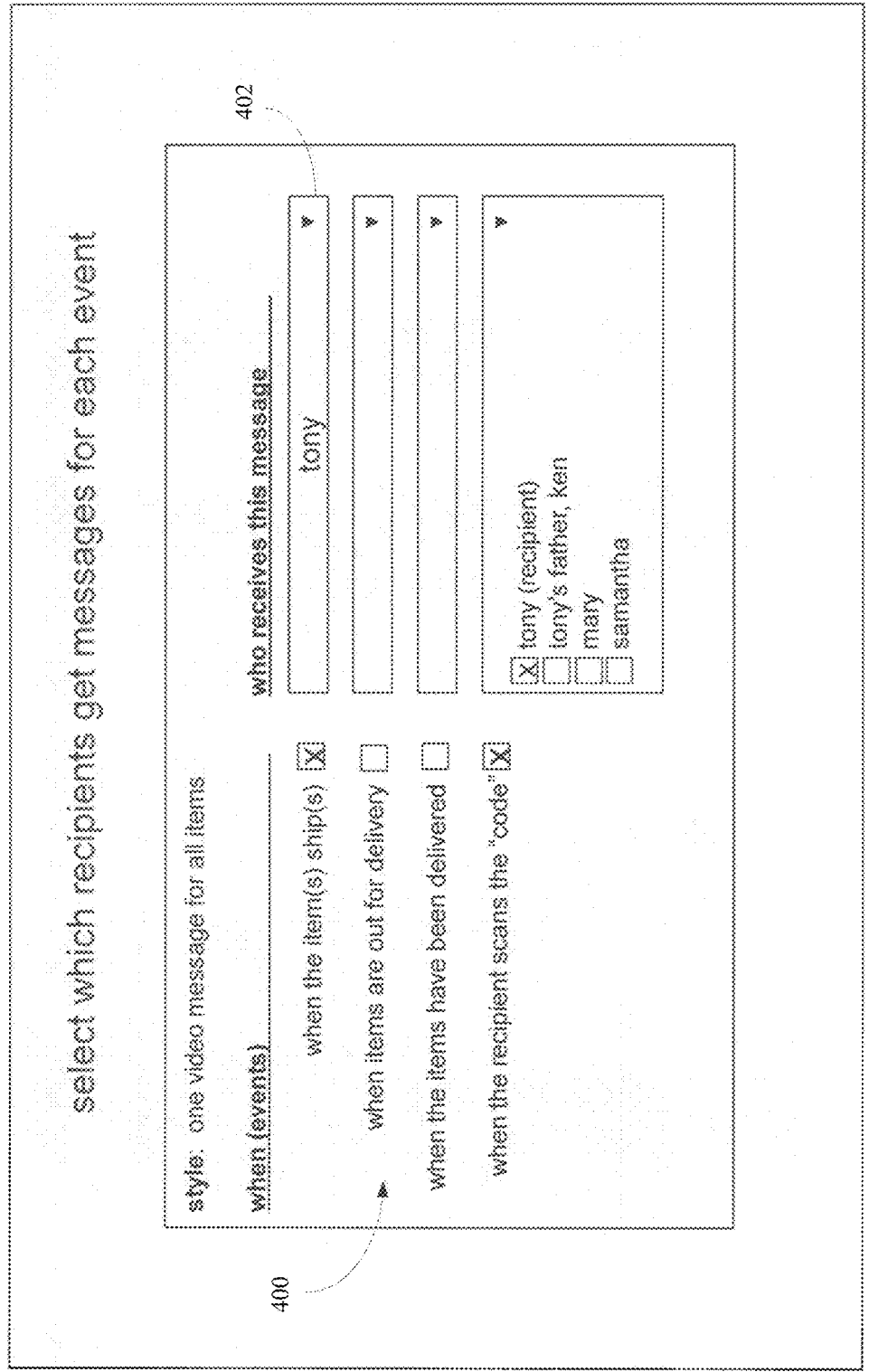
FIGS. 4-6 illustrate exemplary pages having exemplary user interface elements for obtaining information related to a personalized message in keeping with the method illustrated in FIG. 2.

In keeping with this example, when a user indicates a desire to create one or more personalized messages for the product purchase order in its entirety, e.g., the user has clicked on user interface element 300A in exemplary webpage 300, the system will then invoke a wizard that provides user interface elements that are intended to guide and assist a user in providing some or all of the information that is needed by the system to create and disseminate the personalized message(s). As shown in FIG. 4, the wizard can present to the user various selectable order fulfillment process events 400 that will be used by the system to trigger the sending of a personalized message. While not intended to be limiting, the user can specify (by selecting an appropriate check box) that a personalized message is to be sent to an intended recipient when the product purchase order has shipped, when the product purchase order is out for delivery, when the product purchase order has been delivered, when a certain date and/or time occurs, after a certain amount of time has lapsed from the placing of the product purchase order, etc. The system may also allow the user to specify that a selected triggering event is to be considered to be a "trigger" when the event is associated with a first or last product in the product purchase order being shipped, delivered, etc. in the event that product in the product purchase order needs to be separately shipped to an intended recipient.

In addition to specifying the triggering event that will be used by the system to cause a sending of a notification which will include a personalized message (or a link to a personalized message), the wizard may additionally direct the user to specify the intended recipient(s) of the notification. In the example illustrated in FIG. 4, the wizard may present the user with a drop down listing of possible intended recipients 402 for each of the possible selectable notification events. This listing may be pre-populated with names from the user's address book(s), from the user's prior shipping history, or the like (locally and/or remotely stored) without limitation. The user may then select, for example via use of a checkbox, the desired recipient(s) for the various notifications. When the user identifies an intended recipient for a personalized message that is to be sent when a trigger condition occurs, the system may further present to the user known contact information for that user, e.g., a cell phone number, email address, or the like, by which the user can specify how the personalized message (or link to the personalized message) is to be sent to the recipient. In some cases, when a user specifies a mode of notification that the system knows will not support direct sending of the personalized message, the selection of the notification mode by the user will cause the system to automatically send a link to the personalized message with the notification. It will also be appreciated that the wizard should also provide a mechanism for the user to select "other" for the intended recipient and/or notification method whereupon the user can manually enter a new contact name and/or notification delivery method. Preferably any such newly entered information will be stored for later use by the system in auto-populating the fields should the user again decide to send personalized messages in connection with a product purchase order.

It will additionally be appreciated that, when a personalized message is to be indirectly sent to an intended recipient by means of a link sent in physical form, e.g., with the link being included on a shipping label or otherwise included with shipped product, the wizard need not obtain from the user a triggering event, contact information, or notification method. Rather, in this case the triggering event can be the considered to be the shipment of the product order (preferably the first product in the case where a product order is required to be separately shipped) with the notification then being included with the shipped product.

Figure 5:
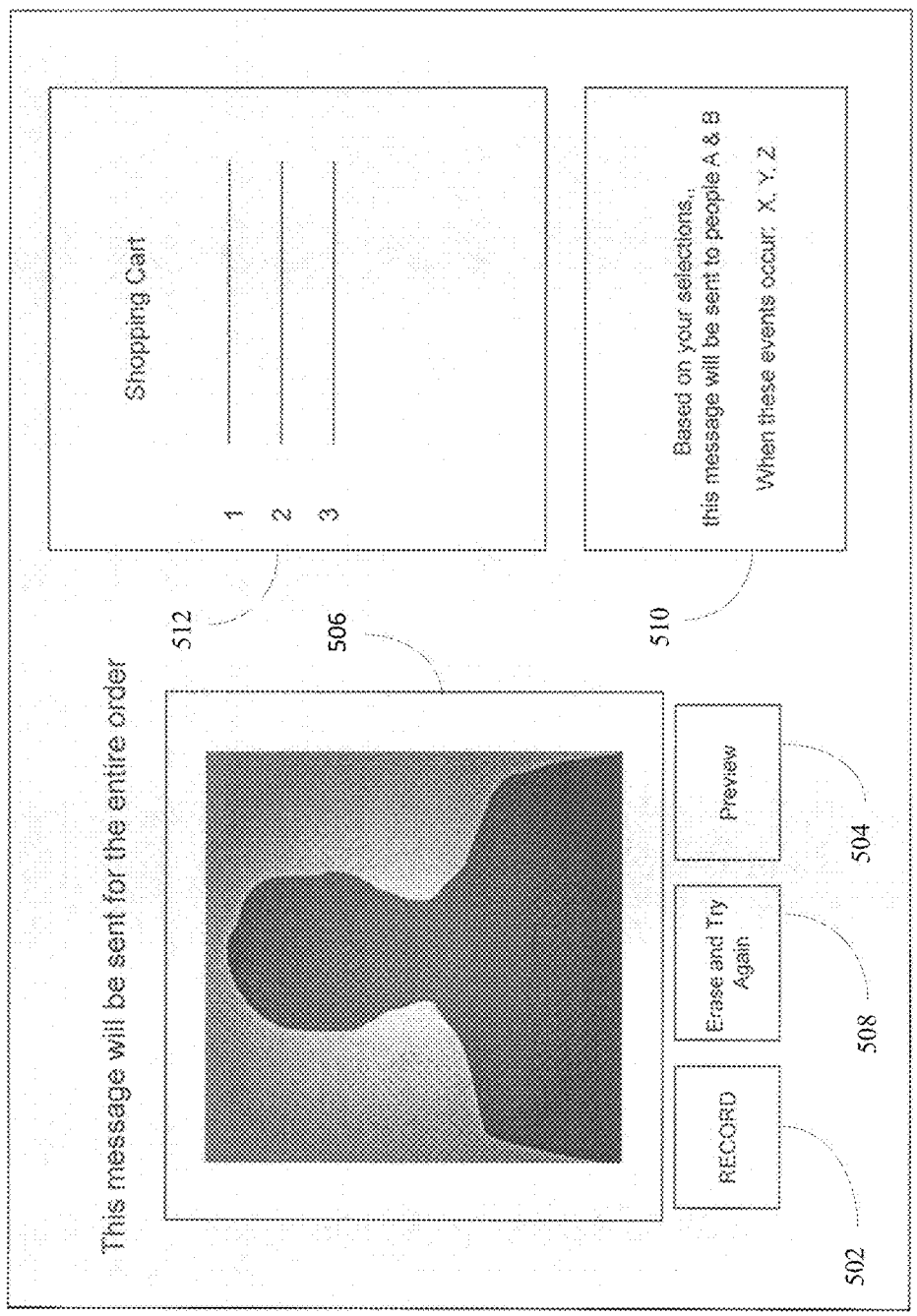

Once the information needed to disseminate a notification to an intended recipient has been obtain (or before if desired), the wizard will then function to assist the user in creating the personalized message(s) for the intended recipient(s). To this end, as illustrated in FIG. 5, the wizard may present a user interface element 502 by which the user can initiate a recording of the personalized message. As will be appreciated, the wizard will cooperate with the client device 20 to facilitate the recording of the personalized message, whether by use of the camera 57 and/or microphone 55. After recording of the personalized message has started, a subsequent user interaction with the user interface element 502 can be interpreted by the wizard as an end of recording command. Alternatively, a "stop recording" user interface element can be provided.

Upon completion of the recording of a personalized message, the user can activate a "preview" user interface element 504 to view the recorded personalized message (in the case where the personalized message is a video message) in a view box 506 on the client device 20 (and/or listen to the personalized message via the speakers of the client device 20) and/or can activate user interface element 508 to initiate an erasure of the recorded message. When the user is satisfied with the recorded personalized message(s), the user can request that the personalized message be stored at the vendor/host system 68 for dissemination in accordance with the user's instructions. While not required, the wizard may also present to the user a summary of these instructions 510 as well as a summary of the product purchase order 512.

It will also be appreciated that the system may also provide an option whereby a user may upload to the vendor/host system 68 a video, images, and/or an audio message that was previously recorded by the user, for example as already stored in the memory of the client device 20 and/or in the cloud. Furthermore, the system may provide a phone number that the user can call to record a personalized voice message (for example when the user does not have a camera or microphone associated with their client device 20). In such a case, a passcode would preferably be provided to the user to allow the recorded personalized voice message(s) to be associated with the appropriate purchase order notification(s).

In some circumstances, the system may further provide the user with the ability to add a substitute background to a recorded video message. To this end, the system may provide a user with selectable substitute backgrounds (which the system may further charge the user for the use thereof).

The functionality for removing the background from the recorded video message and for substituting a new background can be the same as or similar to the functionality described in U.S. Pat. No. 7,720,283 the disclosure of which is incorporated herein by reference in its entirety. Still further, the system may provide the user with the ability to have pre-recorded video (e.g., scenes from a movie or the like) woven into a message that is being recorded, to incorporate the use of background music, etc. An option may also be provided to have a message recorded for the user by a celebrity, an employee of the vendor, etc. The "script" for such to-be recorded messages may be generated by the user or the user may select from one or more pre-prepared message dialogues.

Figure 6:
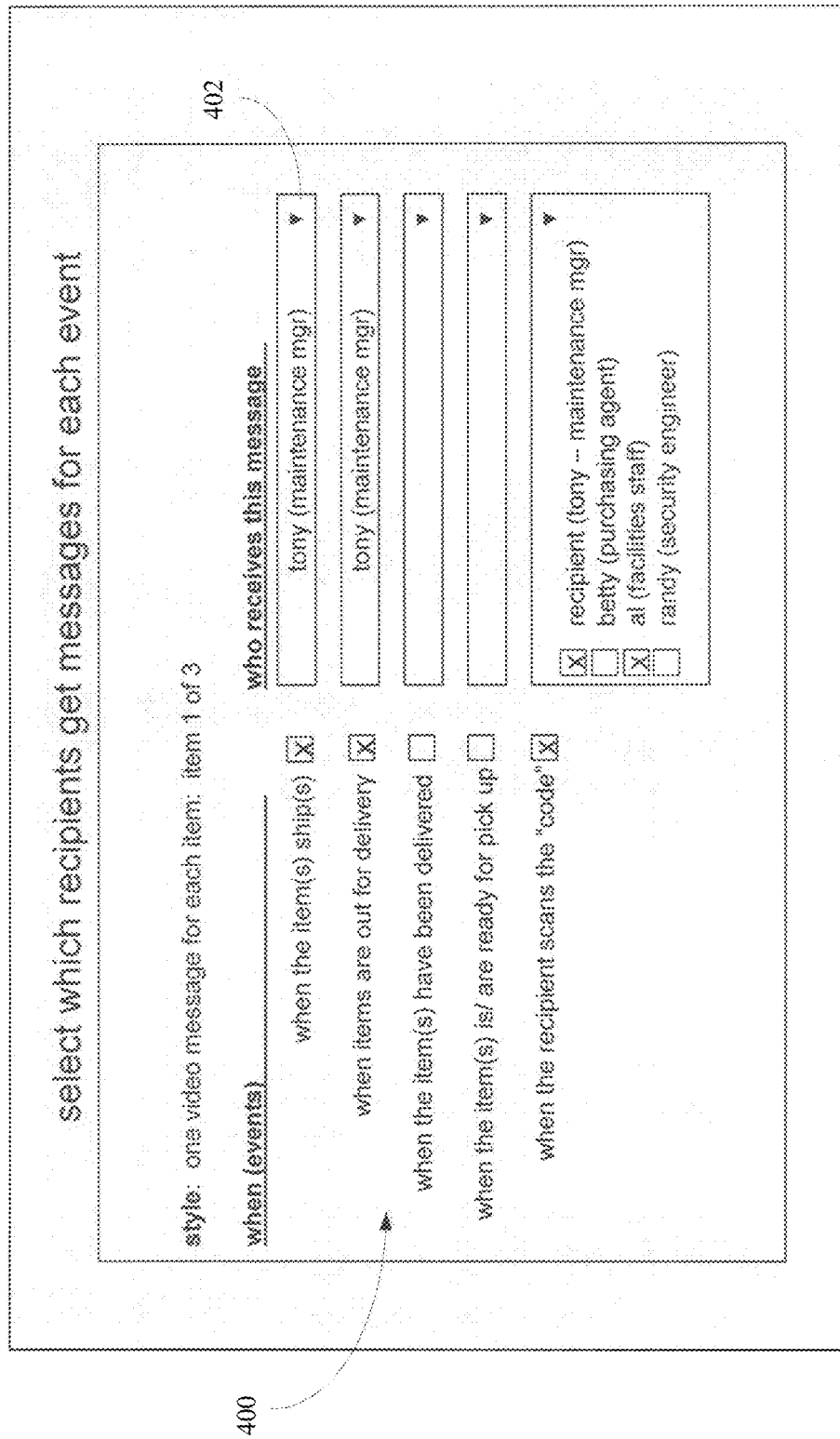

In keeping with the foregoing examples, FIG. 6 illustrates an exemplary wizard for assisting a user in creating personalized messages for individual items within a product purchase order. In this case, the wizard will present user interface elements as before to obtain the same types of information excepting that the wizard will obtain such information for each of the one or more products in the purchase order for which the user desires to send a personalized message.

Figure 7:
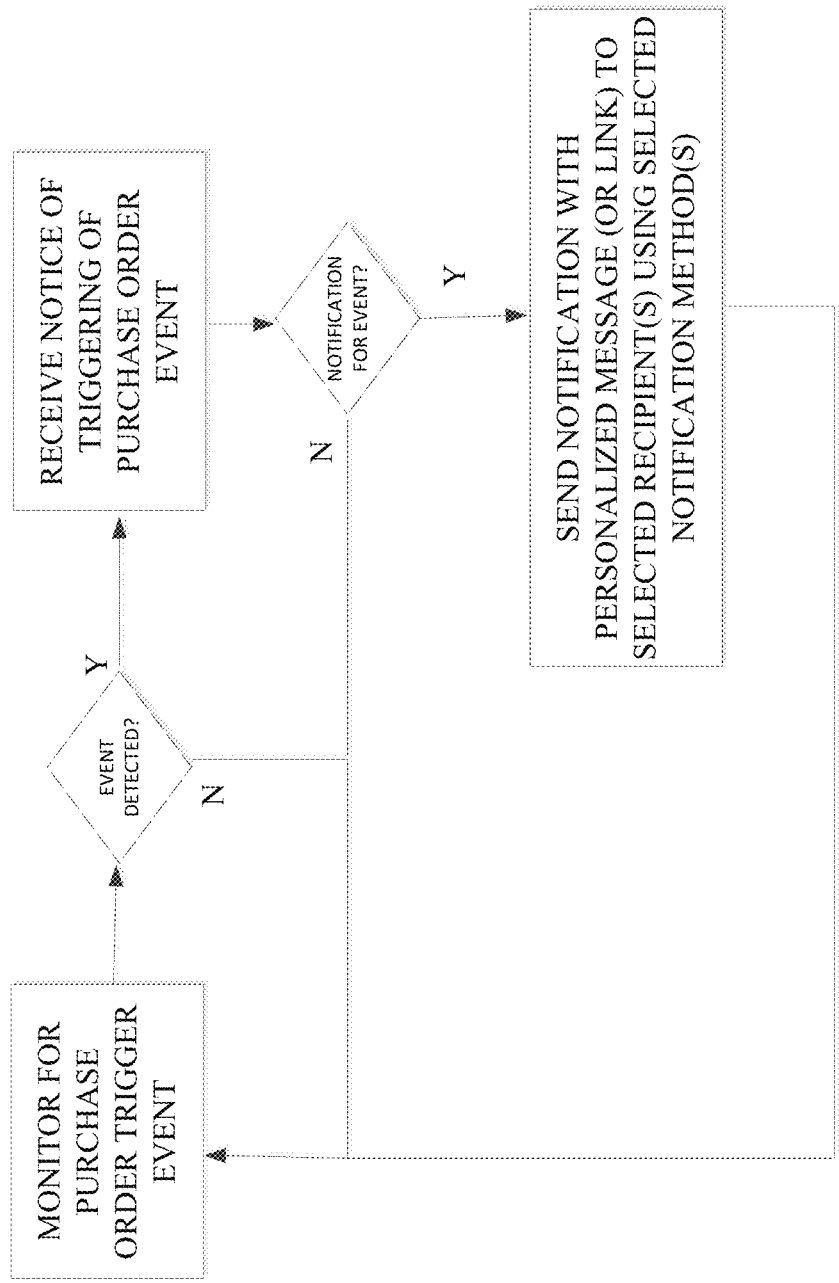
FIG. 7 illustrates an exemplary method used to disseminate information related to a personalized message.

Turning now to FIG. 7, an exemplary method for disseminating the created personalized messages is illustrated. To this end, the system will monitor the various purchase order fulfillment processes for the purpose of detecting the occurrence of a predefined event that is associated with a particular product purchase order. As noted above, such predefined events may include a shipment of one or more products in a particular product purchase order, the delivery of one or more products in a particular product purchase order, etc. Accordingly, the monitoring of the various purchase order fulfillment processes may involve the monitoring of communications being sent from the systems of one or more third party service providers, e.g., third party delivery services.

When an event has been detected for a particular product purchase order, e.g., the product purchase order has been shipped, the system then determines if the detected event is a notification trigger for that particular product purchase order. If the detected event is a notification trigger for that particular product purchase order, the system then determines if a personalized message is to be included with the notification and, if so, the method by which the personalized message is to be delivered to the one or more intended recipients thereof. The personalized message (or a link thereto) is then caused to be disseminated to the intended recipient by the methodology indicated, e.g., via email, text message, and/or by printed material included with the shipped product.

The following now provides exemplary use cases of the system and methods described above. From the descriptions set forth above, one of skill in the art will readily recognize how the system can be configured to fulfill the requirements of these exemplary use cases.

Use case 1—Uncle Geoff want to buy his nephew a $100 gift card from an online music vendor. During or immediately after the checkout process, the vendor's system will ask Geoff if he wants to record a personal video message to send to his nephew. His nephew's (recipient) name is associated with an email address or a smart phone number that is stored in the address book on his device or in the cloud. This information is extracted from Geoff's device and used by the wizard in connection with the personalized message creation process. Since this gift is an electronic gift (the recipient will receive a link or serial number that activates the gift), as soon as Uncle Geoff finishes the order, that video message will be sent to his nephew. If in email, his nephew can click on a link to view the video, or the video can be embedded and viewed inside the email. If via MMS, his nephew will be alerted when the message arrives on his smart phone and he can view the personalized message that way.

Use case 2—Geoff is buying his cousin a gift from an online electronics retailer. His cousin, Fern, has a wish list on that site. Geoff adds one of the items from Fern's wish list to the shopping cart. Upon checkout, Geoff uses the wizard and records three personalized messages for Fern. The first personalized video message is specified to be sent when the order is determined to have a status of "shipped out of the warehouse." "Hey, Fern, this is Geoff. I wanted to surprise you with a gift. Company x has just notified us that your order has shipped. I'm not telling you what it is, but it is something from your wish list." The second personalized video message is specified to be sent to Fern when the item is determined to have a status of "out for delivery." Fern receives an MMS from company x and plays the video: "Fern, it looks like the shipping company is out delivering your order right now. I'm guessing you're excited and you might want to head straight home from school if you're not home now." The third personalized video message is accessed when the recipient opens the package and scans a barcode or QR code on the outside of the box or contained inside the box, the bar code/QR code containing a link to uncle Geoff's personalized video message. "Fern! I bet you didn't think anyone would buy you that tablet device on your wish list. You deserve it. After all, it's your birthday!"

Use case 3—Geoff is on his laptop buying his brother, Ron, two items. One item is from his brother's wish list. The other items is a gift that is not on his brother's wish list. During the checkout process, the online vendor's system prompts Geoff to record personalized video messages. Since this order has two types of items (wish list, non-wish list), Geoff chooses to use a video template to record his message, one message for each item. The template has the ability to filter out the background Geoff is recording in and the system can "green screen" Geoff onto a "good luck!" background provided by the supplier. In the first message spot, Geoff says a few words about the wish list gift. In the second message spot, Geoff says a few words about the other item he selected to buy for his brother. The system glues the messages together in between the supplier's template messages using scene fading, special effects, etc. with a resulting message being: <System>: Ron! This is company A. Congratulations! Your brother, Geoff, just bought you an item from your wish list. It's a pair of black dress pants" <Geoff says> Ron, I hope you like these. You'll need them for that interview you have next week! I'm including an interactive image of those pants" <MMS video message shows interactive picture of black pants>. <Ron closes the interactive viewer for the pants>. <System says> but that's not all! Your brother Geoff also bought you something else. <Geoff says> since you're interviewing, Ron, I also bought you a real nice shaving kit, the handle is pure nickel! Good luck! (System shows image of product while playing audio of Geoff's voice). <System says> thanks to both of you for shopping at company A.

Use case 4—A building's maintenance manager, Tony, is examining the rooftop of the building. He uses his smart phone to access a b2b vendor's site to purchase a few items needed for this job. During the purchase, tong records a message using his smart phone. <Tony says (front camera pointed at Tony's face)> Hey, Al. I'm on top of the building in the north east corner. That hail last night did some damage up here to the skylights. Let me show you the cracks that were created <points smart phone's back camera at damaged skylights and points with finger>. You can see this crack is pretty big right here. I just ordered the replacement domes from company G. Actually, you'll get a text from company G when they are ready for pick up at the maple street branch. In this video message I am also including an active link to Bob's contact info. I want you to work with Bob to get these fixed as soon as possible. This message is specified to go out when the order is placed. Tony, also creates a personalized video message for another person in his company, Betty, that works inside the room where the cracked skylights are. Tony assigns in the vendor's system this personal message to go to Betty right after the purchase order is detected to have a status of "picked up." So, as Al is walking out of company G's store, Tony's message is sent to Betty saying "Hey, Betty. You're getting this message because Al just left the store with replacement domes for the skylights in your room—they were damaged by the hail from last night's storm. Please know that Al will be up on the roof in an hour or so, so don't be startled."

Based on the foregoing exemplary use cases, it will be appreciated that the system and methods described herein allow a user to select the person(s) to receive the personalized message and the supply chain event that is to trigger the sending of the corresponding personalized message. Also, if the user does not supply a personalized message, the user can select from one of many pre-recorded messages. Furthermore, it is to be understood that the events used to trigger the sending of the messages need not be limited to events associated with the product purchase order fulfillment process. Rather, any detectable supply chain event, e.g., a new product being added to a catalog, a product being selected from a wish list (for example, the sending of a message "thank you for getting this item from my wish list"), can be used as a trigger in the manner described above.

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transient computer readable storage media have stored thereon instructions for making a recorded video and/or audio message available to a second party, the instructions performing steps comprising:
   providing to a client computing device one or more user interface elements by which a first party, different than the second party, associates a specific triggering event originating from a third party, different than the second party and the first party, with the recorded video and/or audio message and an address used to electronically transmit the recorded video and/or audio message to the second party upon the occurrence of the specific triggering event;
   monitoring a supply chain management system associated with the third party to discern the occurrence of the specific triggering event; and
   upon the occurrence of the specific triggering event automatically causing at least one of a link to the recorded video and/or audio message and the recorded video and/or audio message to be electronically transmitted to the second party via use of the address;
   wherein the third party is a vendor of a product, the first party is a purchaser of the product, the second party is an intended recipient of the ordered product, and the specific triggering event comprises a product order placed with the vendor by the first party being provided with a status within the supply chain management system of having been completed, out for shipment, delivered, or picked up, a wizard is invoked at a predetermined point in an on-line process used by the first party to place the product order with the vendor, and the wizard functions to provide the user-interface elements on the client computing device.

2. The non-transient computer readable media as recited in claim 1, wherein the recorded video and/or audio message is received from the client device.

3. The non-transient computer readable media as recited in claim 1, wherein the recorded video and/or audio message is selected from a plurality of recorded video and/or audio messages stored on a storage device located remotely from the client device.

4. The non-transient computer readable media as recited in claim 1, wherein the address comprises an email address.

5. The non-transient computer readable media as recited in claim 1, wherein the address comprises a cellular phone number.

6. The non-transient computer readable media as recited in claim 1, wherein the instructions automatically extract a plurality of addresses from a contacts list on the client computing device from which the address used to electronically transmit the recorded video and/or audio message is selected.

7. A method for making a recorded video and/or audio message available to a second party, the method comprising:
   providing to a client computing device one or more user interface elements by which a first party, different than the second party, uses a camera and/or a microphone associated with a computing device to record a video and/or audio message;
   providing to the client computing device one or more user interface elements by which the first party associates a specific triggering event originating from a third party, different than the first party and the second party, with the recorded video and/or audio message;
   providing to the client computing device one or more user interface elements by which the first party associates an address with the recorded video and/or audio message;

monitoring a supply chain management system associated with the third party to discern the occurrence of the specific triggering event; and upon the occurrence of the specific triggering event automatically causing at least one of a link to the recorded video and/or audio message and the recorded video and/or audio message to be electronically transmitted to the second party via use of the address;

wherein the third party is a vendor of a product, the first party is a purchaser of the product, the second party is an intended recipient of the ordered product, and the specific triggering event comprises a product order placed with the vendor by the first party being provided with a status within the supply chain management system of having been completed, out for shipment, delivered, or picked up, a wizard is invoked at a predetermined point in an on-line process used by the first party to place the product order with the vendor, and the wizard functions to provide the user-interface elements on the client computing device.

8. The method as recited in claim 7, wherein the address comprises an email address.

9. The method as recited in claim 7, wherein the address comprises a cellular phone number.

* * * * *